(12) United States Patent
Ma et al.

(10) Patent No.: US 8,878,987 B2
(45) Date of Patent: Nov. 4, 2014

(54) CAMERA MODULE HAVING TIGHTENING RING FOR FIXING LENS TO LENS HOLDER

(71) Applicant: Hon Hai Precision Industry Co., Ltd., New Taipei (TW)

(72) Inventors: Feng-Yang Ma, New Taipei (TW); Shao-Hung Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/904,948

(22) Filed: May 29, 2013

(65) Prior Publication Data

US 2013/0342748 A1 Dec. 26, 2013

(30) Foreign Application Priority Data

Jun. 20, 2012 (TW) .............................. 101122025 A

(51) Int. Cl.
*H04N 5/225* (2006.01)
*G02B 7/02* (2006.01)
*H01L 31/0203* (2014.01)

(52) U.S. Cl.
CPC ..................................... *G02B 7/026* (2013.01)
USPC ............ 348/374; 348/357; 257/433; 250/239

(58) Field of Classification Search
USPC .................... 348/357, 374; 250/239; 257/433
See application file for complete search history.

(56) References Cited

U.S. PATENT DOCUMENTS

| | | | |
|---|---|---|---|
| 6,977,783 B2 * | 12/2005 | Lung | 359/819 |
| 7,995,297 B2 * | 8/2011 | Chou et al. | 359/824 |
| 8,107,005 B2 * | 1/2012 | Lee | 348/374 |
| 8,274,599 B2 * | 9/2012 | Gustavsson et al. | 348/374 |
| 8,605,213 B2 * | 12/2013 | Park | 348/374 |
| 8,698,951 B2 * | 4/2014 | Kang et al. | 348/374 |
| 2013/0120648 A1 * | 5/2013 | Oh | 348/374 |
| 2013/0250170 A1 * | 9/2013 | Oh | 348/374 |

* cited by examiner

*Primary Examiner* — Ngoc-Yen Vu
(74) *Attorney, Agent, or Firm* — Novak Druce Connolly Bove + Quigg LLP

(57) ABSTRACT

A camera module includes a lens and a lens holder. The lens has a connecting barrel. The lens holder includes a base plate, a number of claws extending up from the base plate and sleeving on the connecting barrel, a fixing block extending up from the base plate and defining a fixing hole, a tightening ring sleeving on the claws and having two end sections sandwiching the fixing block. The tightening ring also includes a tightening screw for threadedly passing the threaded holes to tightening the tightening ring such that the claws deforms and grasps the connecting barrel.

3 Claims, 2 Drawing Sheets

CAMERA MODULE HAVING TIGHTENING RING FOR FIXING LENS TO LENS HOLDER

BACKGROUND

1. Technical Field

The present disclosure relates to camera module and, particularly, to a camera module having a tightening ring for fixing a lens to a lens holder.

2. Description of Related Art

A camera module includes a printed circuit board, an image sensor positioned on the printed circuit board, a lens holder positioned on the printed circuit board surrounding the image sensor, a lens received in the lens holder aligning with the image sensor, and a threaded bolt threadedly passing through a sidewall of the lens holder and pressing the lens against the lens holder. Thus, the lens is held in the lens holder. However, scratching particles may be generated when the threaded bolt presses the lens and the particles then fall onto the image sensor, which will degrade the image quality ability of the camera module.

Therefore, it is desirable to provide a camera module, which can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
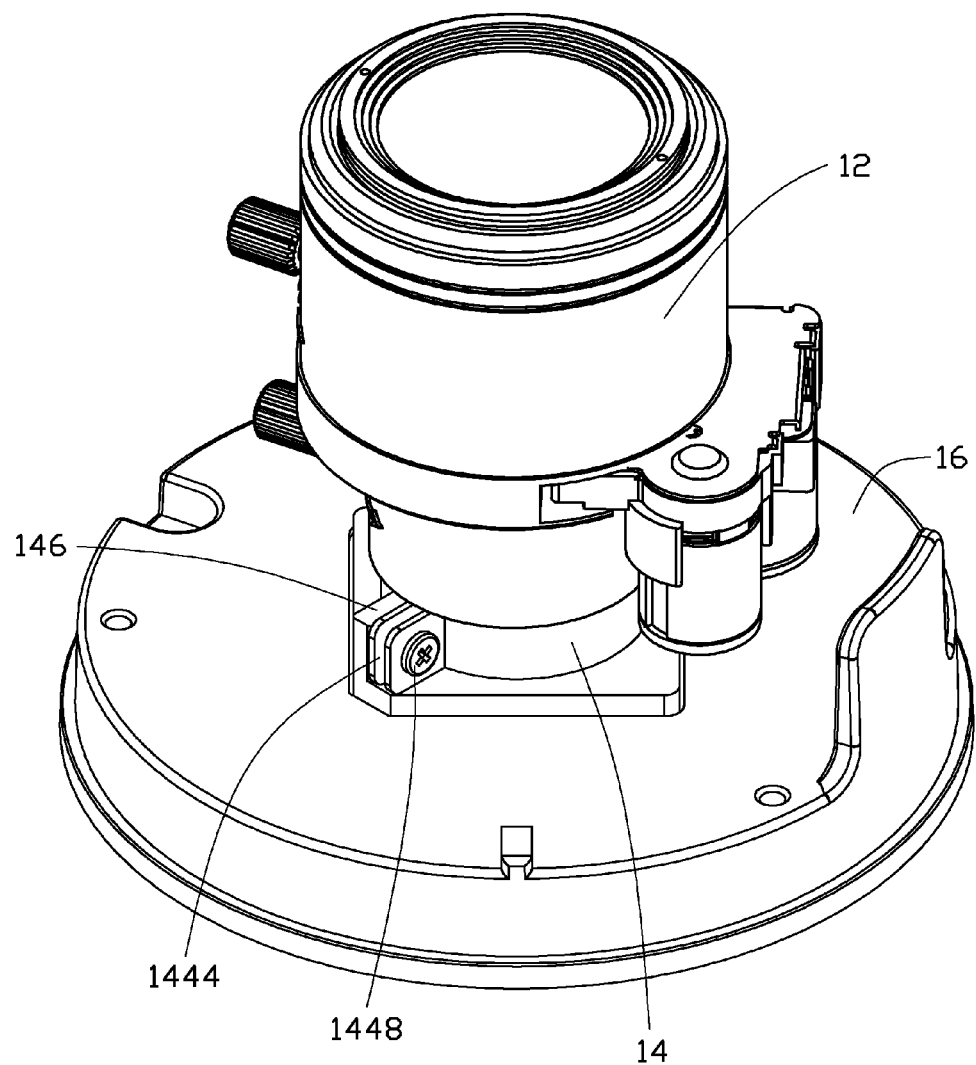
FIG. 1 is an isometric schematic view of a camera module, according to an exemplary embodiment.
Figure 2:
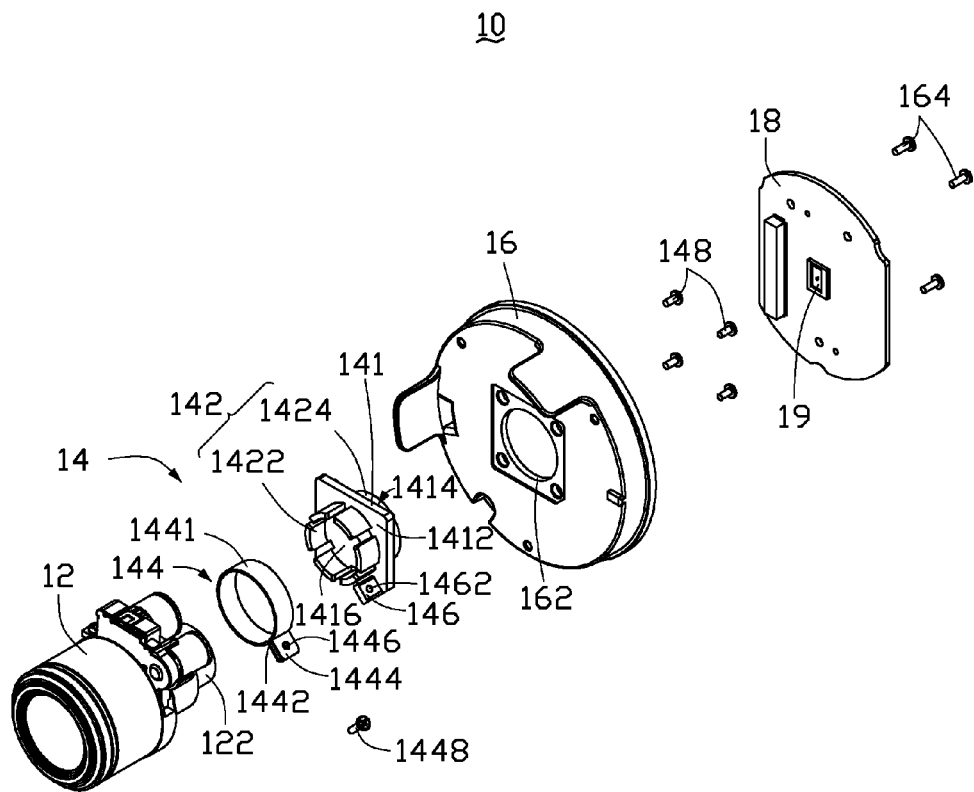
FIG. 2 is an exploded view of the camera module of FIG. 1.

FIGS. 1-2 is a camera module 10 according to one embodiment. The camera module 10 includes a lens 12, a lens holder 14, a supporting board 16, a printed circuit board 18, and an image sensor 19.

The lens 12 may include one or more lenses elements (not shown) and a connecting barrel 122 at an image end side of the lens 12.

The lens holder 14 includes a base plate 141, a tubular connector 142, a tightening ring 144, a fixing block 146, and a number of first screws 148.

The base plate 141 includes a first surface 1412 and a second surface 1414 opposite to the first surface 1412, and defines a first through hole 1416 passing through a center of the first surface 1412 and the second surface 1414.

The tubular connector 142 includes a number of arcuate claws 1422 extending up from the first surface 1412 and a covering tube 1424 extending up from the second surface 1414. The claws 1422 are arranged in a circular configuration encircling the first through hole 1416 and having an inner diameter slightly larger than an outer diameter of the connecting barrel 122.

The tightening ring 144 includes a ring-shaped elastic belt 1441 with two distal end sections 1444 bent outwards to form an opening 1442 between the end sections 1444 therebetween. Each of the end sections 1444 defines a threaded hole 1446. The threaded holes 1446 align with each other. An inner diameter of the tightening ring 144 is substantially smaller than an outer diameter of the tubular configuration of the claws 1422. The tightening ring 144 also includes a tightening screw 1448.

The fixing block 146 extends up from the first surface 1412, is located outside the claws 1422, and defines a fixing hole 1462 extending through a center of the fixing block 146 along a direction that is substantially parallel with the first surface 1412.

The supporting plate 16 defines a second through hole 162 which has a diameter slightly larger than an outer diameter of the covering tube 1424. The supporting plate 160 also includes a number of second screws 164.

In assembly, the image sensor 19 is positioned on and electrically connected to the printed circuit board 18.

The claws 1422 sleeve on the connecting barrel 122 and the tightening ring 144 sleeves on the claws 1422. The fixing block 146 is sandwiched between the two end sections 1444. The fixing hole 1446 aligns with the threaded holes 1462. The tightening screw 1448 threadedly passes the threaded holes 1462 and the fixing hole 1446 and thus tightens the tightening ring 144 against the claws 1422 as the outer diameter of the claws 1422 is slightly lager than the inner diameter of the tightening ring 144. As a consequence, the claws 1422 deform and press the connecting barrel 122, thus firmly grasping the connecting barrel 122.

The covering tube 1424 is inserted into the second through hole 162 and the base plate 141 is attached to the supporting plate 16 by the first screws 148.

The printed circuit board 18 is attached to the supporting plate 16, opposite to the base plate 141, by the second screws 164, and the image sensor 19 is enclosed by the covering tube 1424 and aligns with the lens 12.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A camera module, comprising:
a lens comprising a connecting barrel; and
a lens holder, comprising:
   a base plate comprising a first surface and a second surface opposite to the first surface, the base plate defining a first through hole passing through the first surface and the second surface;
   a plurality of claws extending up from the first surface and arranged in a circular configuration encircling the first through hole and has an inner diameter slightly lager than an outer diameter of the connecting barrel, the claws sleeving on the connecting barrel;
   a fixing block extending up from the first surface, located outside the claws, and defining a fixing hole therethrough along a direction that is substantially parallel to the first surface; and
   a tightening ring comprising a ring-shaped elastic belt having two distal end sections sandwiching the fixing block, each of the end sections defining a threaded hole aligning with the fixing hole, an inner diameter of the tightening ring being slightly smaller than an outer diameter of the tubular configuration of the claws, the belt sleeving on the claws, the tightening ring also comprising a tightening screw for threadedly passing the threaded holes to tightening the tightening ring such that the claws deforms and firmly grasps the connecting barrel.

2. The camera module of claim 1, further comprising a supporting plate, the supporting plate defines a second through hole, the lens holder comprising a covering tube extending up from the second surface and aligning with the periphery of the first through hole, the lens holder comprising a number of first screws, a diameter of the second through hole being slightly greater than the outer diameter of the covering tube, and the covering tube inserting into the second through hole and the base plate being attached to the supporting plate by the plurality of first screws.

3. The camera module of claim 2, further comprising a printed circuit board and an image sensor positioned on and electrically connected to the printed circuit board, the supporting plate comprising a plurality of second screws, the printed circuit board being attached to the supporting plate, opposite to the based plate by the plurality of second screws, and the image sensor being enclosed by the covering tube and aligning with the lens.

\* \* \* \* \*